United States Patent [19]

Duff et al.

[11] 4,113,437

[45] Sep. 12, 1978

[54] LIQUID STORAGE DEVICE

[75] Inventors: Ian David Duff, New York, N.Y.; John Hamilton Kennedy; Roger Abraham Bunce, both of Birmingham, England

[73] Assignee: The Secretary of State for Social Services, London, England

[21] Appl. No.: 712,164

[22] Filed: Aug. 6, 1976

[30] Foreign Application Priority Data

Aug. 13, 1975 [GB] United Kingdom ............... 33797/75

[51] Int. Cl.2 .......................... B01L 3/00; G01N 1/10

[52] U.S. Cl. .................................... 422/63; 73/423 A; 222/587; 422/64; 422/103; 422/106; 422/119

[58] Field of Search ............................. 23/259, 253 R; 73/423 A; 222/585, 586, 587, 588

[56] References Cited

U.S. PATENT DOCUMENTS

| | | | |
|---|---|---|---|
| 175,066 | 3/1876 | Gates | 23/259 |
| 1,016,365 | 2/1912 | Rosenfeld | 222/587 |
| 3,284,164 | 11/1966 | Hach | 23/259 X |
| 3,549,330 | 12/1970 | Jungner et al. | 23/259 |
| 3,607,099 | 9/1971 | Scordato et al. | 23/259 |
| 3,929,411 | 12/1975 | Takano et al. | 23/259 |

*Primary Examiner*—Joseph Scovronek
*Attorney, Agent, or Firm*—Reed Smith Shaw & McClay

[57] ABSTRACT

The liquid storage device comprises a rotary heat-insulated jacket mounted on a stationary base to rotate about a vertical axis. The jacket is formed to carry a plurality of inverted liquid containing vials, situated at least partially within the jacket, the vials being in communication with respective take-off cups which are arranged near the base of the jacket and around the periphery thereof and from which liquid specimens can be drawn off. A constant level device ensures that the level of liquid in the cups is kept at a substantially constant level. The jacket is provided with a stepping drive so that it can be stepped about its rotary axis to bring any selected cup into a liquid take-off position.

The interior of the jacket is cooled with circulating, cold air and the temperature of the vials is kept at a predetermined value, below ambient, by an air heater.

The storage device is intended for storing reagents to be used in an automatic blood analyzing machine.

11 Claims, 2 Drawing Figures

LIQUID STORAGE DEVICE

This invention relates to a liquid storage device.

According to the invention there is provided a liquid storage device comprising a heat-insulated jacket formed to carry a plurality of liquid storage containers so that when positioned in said jacket such containers are at least partially situated within the jacket, means arranged to maintain the temperature of the liquid storage containers at a predetermined value, and liquid take-off means which are arranged to be connected to such containers when in position in the jacket and which are accessible from externally of the jacket so that, in use, liquid from the containers may be drawn off.

In one preferred arrangement, the liquid take-off means comprise respective liquid take-off cups for such liquid storage containers and means for maintaining the load of liquid in the cups substantially constant.

Figure 1:
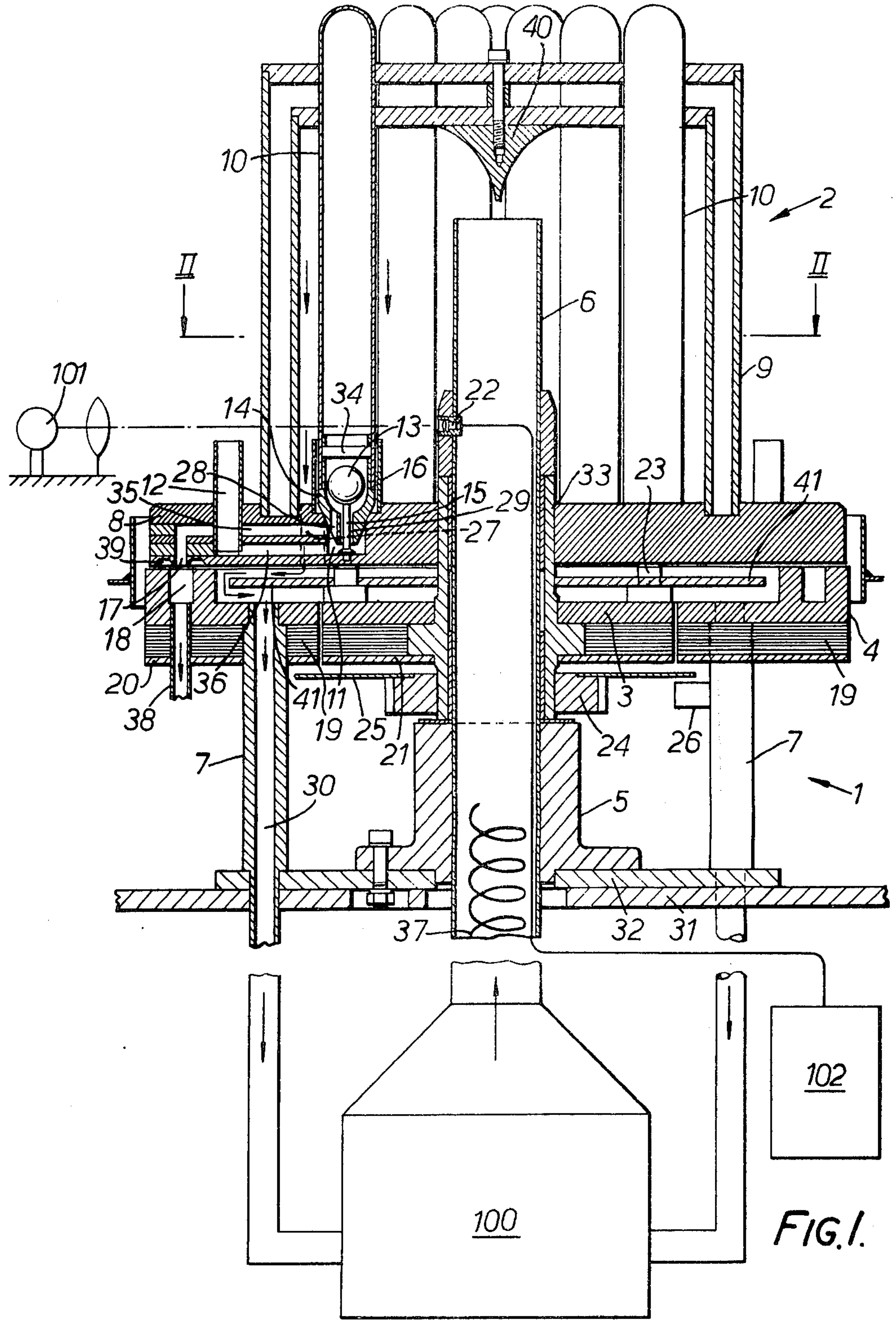
Figure 2:
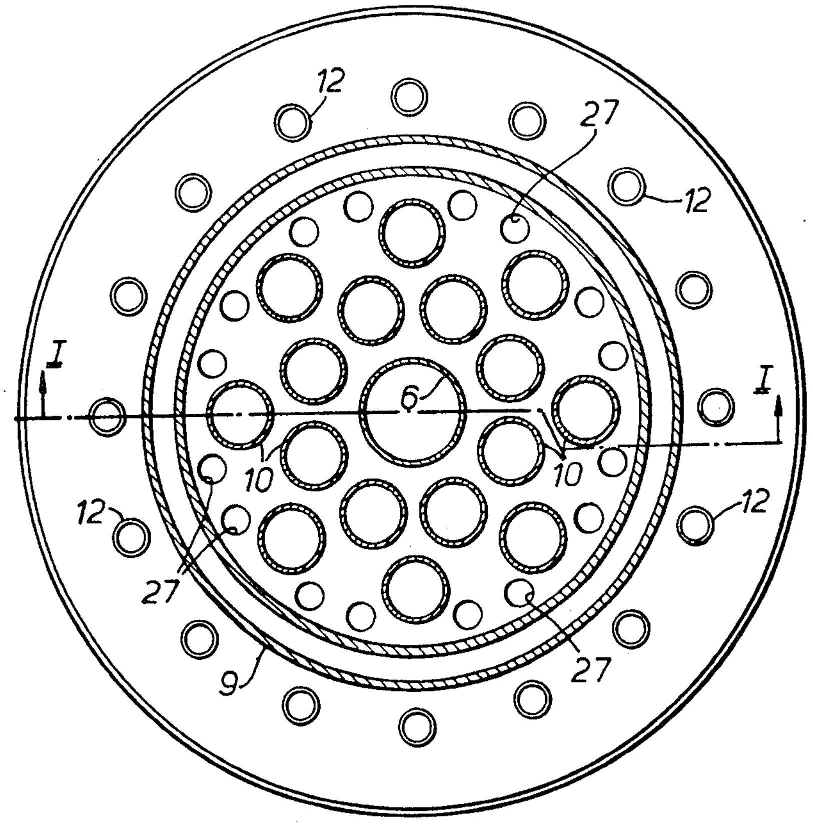

For a better understanding of the invention, and to show how the same may be carried into effect, reference will now be made, by way of example, to the accompanying drawings, in which:

FIG. 1 is a vertical section, taken along the line I—I of FIG. 1, through one form of liquid storage device in accordance with the invention, and FIG. 2 is a cross-sectional view taken along the line II—II of FIG. 1.

The storage device is for reagents in a preferred application and comprises essentially a stationary base 1 and a rotary assembly 2 whose axis of rotation is vertical.

The base 1 comprises a base plate 31, a central boss 5 which is bolted to the plate 31 by means of a spacer plate 32, an annular plate 4 mounted above the base plate by means of four columns 7 secured to the spacer plate, and a fixed vertical air supply pipe 6 which is mounted in the boss and extends into the rotary assembly to terminate at a position close to the top of the rotary assembly. The pipe 6 serves as a bearing for the assembly 2.

The rotary assembly 2 comprises a circular base part 8 and, mounted on top of the base part, a cylindrical heat-insulated jacket 9 of double-walled construction which is concentric with the base part, the base part and jacket 9 together forming a removable unitary part. The base part is positioned around a journal 33 rotatably mounted on the air supply pipe and is supported from below by four columns such as 23 which are upstanding from a plate 3 also carried by the journal. Drive means (not shown), such as a stepping motor driving the jacket by means of a gear 24 or timing belt, are provided for indexing the jacket about its axis of rotation through up to a half revolution in both senses from a datum angular position into a new datum position. The gear or timing belt drives the base plate 3 which in turn drives the circular base part 8 by means of pegs of the columns 23 which engage with the base part 8. With this arrangement the jacket may be indexed accurately by steps, not exceeding half a revolution, which are multiples of 1/16 rev. in a maximum time of 3 sec.

The walls of the jacket are suitably apertured at the top to receive a plurality of inverted reagent storage containers 10 which when in position in the jacket, with just the upper end portions of the inverted containers protruding upwardly beyond the top of the jacket, form two concentric circular arrays (FIG. 2) centered on the vertical axis of the jacket.

Each reagent storage container comprises a conventional test tube or vial into whose open end is fitted a plug 14 of resilient plastics materials which is finned on the outside to form a liquid-tight seal with the wall of the vial. The plug is formed with two holes 28, 29 of which the former hole serves as an air vent and the latter one as a liquid outlet hole, and as clearly shown in FIG. 1 the plug has a conical end portion so that it tapers externally towards its outlet end. The reason for this is that any reagent adhering to the sides of the plug tends to run to the lower end so that, on withdrawing the storage container from the jacket 9, reagent droplets tend to fall into an open chamber 11, intended for that particular storage container, so as not to contaminate the other chambers 11. A ball 13 of a ball valve included in the plug 14 closes the holes 28, 29 when the vial is inverted, to prevent the escape of reagent as the container is positioned in the jacket, and a pin 34 limits the extent to which the ball can be displaced away from its seating where it is in a hole closing position, so as to prevent the ball sinking to the bottom of the vial on removing the same from the jacket and then turning it the right way up.

To receive the plugged ends of the inverted reagent storage vials, the base part 8 is formed with the above-mentioned open chambers 11 in which the conical portions of the plugs rest. A pin 15 projecting upwardly from the base of each chamber lifts the ball off its seating when the reagent storage vial is properly located in the jacket. A short upright tube 16 fixed in an annular recess in the mouth of each chamber 11 constitutes a guide for the inserted vial and helps to reduce the risk of contamination between the reagents.

Leading radially outwardly from each chamber 11 to a reagent take-off cup 12, which comprises a tube located in a pocket in the circular base part 8 and in which is maintained a substantially constant reagent level as will be explained, are upper and lower bores 35, 36 respectively. As is clearly shown in FIG. 1, each tube partially covers the opening where the bore 36 leads into the cup 12 so as to act as a restrictor and prevent the reagent take-off vessels from overflowing owing to centrifugal force acting on the reagent in the bore 36 during indexing of the jacket. The tubes also substantially prevent evaporation of reagents from the cups 12. The bore 35, communicating with the cup 12 by virtue of the cup tube being drilled through in alignment with the bore 35, continues radially beyond the cup and leads into a downwardly extending bore 17 constituting an overflow.

In the illustrated reagent storage device, it is required to maintain the space enclosed by the rotary jacket at a predetermined value beneath ambient temperature. To achieve this, the pipe 6 is connected at its lower end to a refrigeration system 100 with excess capacity which supplies cool air in the upward direction to the enclosed space. An inverted conical fairing 40 having a concave side surface deflects the air flow outwardly from the axis of the jacket to pass between the reagent storage vials 10 and cool them and than pass downwardly through the base part 8 via sixteen holes 27, into an annular space, between the base 8 and the plate 3, in which is situated a fixed horizontal guide plate 41 which rests on shoulders on the columns 23, so that the cooling air flows around the plate 41 so as to pass beneath the bores 36 and vessels 12, and finally through an outlet passage 30 in the columns 7. These passages are connected by hoses to leads back to the refrigeration system 100 so that the cool air circulates in a substantially closed air cooling circuit (there is a small amount of leakage between the stationary base and the rotary assembly) in order to reduce condensation. Preferably, the reagent storage device is so constructed and arranged that the air flow through the space enclosed by the jacket 9 is turbulent which results in optimum heat transfer. Temperature control is achieved by means of an electrical heating element 37 positioned in the pipe 6 and supplied with the quantity of power necessary to maintain the reagent containers at a predetermined temperature value. Of course, this value could be above ambient temperature simply by replacing the refrigeration system by a heating system. A moisture absorbing chemical unit may be incorporated in the cooling circuit.

To improve the insulation of the reagent storage device, annular plates 20, 21 are fitted to the plates 4, 3 respectively with interposition of insulation 19 which prevents condensation from forming on the lower surfaces of the plates 20, 21.

The way in which the reagent storage device works is as follows. Under normal conditions, the reagent level in each take-off cup 12 is just below the level of the bore 35, the reagent in each cup resting in equilibrium owing to the atmospheric pressure exactly balancing the air pressure in the inverted vial added to the hydrostatic pressure due to the reagent in the vial. In use, a typical application, by means of an encoder disc 25 which is fitted to the gear 24 and to which a suitable stationary detector 26 responds, the stepping motor indexes the rotary jacket into a position in which a selected reagent take-off cup is arranged beneath the tip at the lower end of a vertically displaceable reagent extraction device positioned at a reagent take-off station alongside the jacket 9. The extraction device is displaced downwardly so that its tip is immersed in the reagent in the preselected cup and then a predetermined quantity of reagent is drawn off from this cup. The reagent level starts to fall in the take-off vessel and this results in the level of the appropriate vial falling too. However, because of the consequent reduction in air pressure in the top of the vial, air from the upper radial bore 35 passes through the air vent hole 28 and bubbles through the reagent to restore the reagent level in the take-off cup to substantially its previous level. In fact, the level does not remain precisely constant because of effects such as surface tension but it is always within fairly close limits. Moveover, it will be noted that the balls 13 play no part in the automatic reagent level control and merely serve to prevent the storage containers from leaking when the latter are removed from the jacket. The extraction device is raised and then the next reagent selected. Of course, if the selected reagent take-off vessel is actually beneath the extraction device at the time of selection, the stepping motor remains inoperative.

If a reagent storage vial is repeatedly lifted off its seating and then lowered, a reagent releasing action occurs to supply to the associated take-off cup excess reagent which flows into the bore 35 to the overflow 17 which discharges into an annular drain 18 around which water circulates. The outlet of the annular drain is shown at 38. It will be noted that the overflow 17 is surrounded by an annular groove 39 formed in the underside of the base part 8 so that reagent cannot run on the underside surface and possibly contaminate other parts of the reagent storage device or other reagents.

After repeated use, the reagent levels in the vials 10 fall, and to warn the operator of the reagent storage device when the level of the selected reagent is beneath a predetermined position, a source 101, external to the storage device, permanently directs a focussed light beam at a light sensitive detector 22 which is located in the wall of the tube 6 with an eccentric bush to facilitate adjustment. The change in detected light intensity when the reagent level falls to below the predetermined position gives rise to the required alarm by actuating an alarm unit 102. As the light beam has to pass through the walls of the jacket, the latter can conveniently be made of transparent plastics material.

The reagent storage device may be incorporated in an automatic blood analysing machine including the apparatus disclosed in British Patent Application Nos. 51988/73 and 46608/74, in which case the storage device is used for storing the reagents which are to be transferred by means of the extraction device to the apparatus disclosed in British application Nos. 51988/73 and 46608/74, for analysis of blood specimens.

We claim:

1. Liquid storage apparatus comprising a base part, a heat jacket on said base part, a plurality of liquid storage containers carried by said jacket and disposed with at least their lower parts within said jacket, respective cups for the liquid storage containers, these cups being carried by said base part alongside said jacket and having upwardly facing openings through which access may be gained to liquid in the cups, passage means connecting the containers to the cups to replenish liquid withdrawn from any cup with fresh liquid from the respective liquid storage container, means, responsive to changes in liquid levels in the cups, to maintain the liquid in each cup at a substantially constant level, and means arranged to maintain the internal temperature of the jacket at a substantially constant value.

2. Liquid storage apparatus according to claim 1, wherein the liquid storage containers are each in the form of a removable, inverted vial whose open lower end is closed by a plug which is formed with a liquid outlet hole and includes a ball valve which closes under the action of liquid in the vial to prevent escape of liquid through the outlet hole when the vial is removed from the jacket, and wherein each passage means is provided with an upstanding pin which holds the ball above its seat to allow the respective vial to supply liquid to the associated cup.

3. Liquid storage apparatus according to claim 2, wherein the plug of each liquid storage container is additionally formed with an air vent hole, and wherein the liquid level maintaining means comprises further passage means connecting each air vent hole with the atmosphere, whereby when liquid is removed from any cup, air enters through the air vent hole of the respective liquid storage container and bubbles through the liquid in that container to maintain the liquid in the cup substantially at its previous level.

4. Liquid storage apparatus according to claim 1, further comprising a stationary base on which the said base part, bearing the jacket and said cups, is mounted for rotation about a substantially upright axis, the liquid storage apparatus also comprising stepping drive means for bringing any selected cup into a predetermined position of angular displacement about the axis of rotation of the said base part.

5. Liquid storage apparatus according to claim 1, wherein the temperature maintaining means comprises a refrigeration system, forming part of an air cooling circuit which includes the interior of the heat insulated jacket, an electrical heating element in the circuit, and means arranged to supply to the element the quantity of power necessary to maintain the temperature of the interior of the heat insulated jacket at the said predetermined value.

6. Liquid storage apparatus according to claim 3, wherein the said base part, bearing the jacket and said cups, is mounted on a stationary base for rotation about a substantially upright axis, wherein stepping drive means are provided for bringing any selected cup into a predetermined position of angular displacement about the axis of rotation of the said base part, wherein the temperature maintaining means comprises a refrigeration system forming part of an air cooling circuit which includes the interior of the heat insulated jacket, an electrical heating element in the circuit, and means arranged to supply to the element the quantity of power necessary to maintain the temperature of the interior of the heat-insulated jacket at the said predetermined value, wherein the air cooling circuit additionally includes holes through the said base part to connect the interior of the jacket to the underside of the base part, and an annular space defined between the said base part and the upper part of the stationary base, and wherein an annular plate is secured to the stationary base to be situated in the said annular space so as to cause air passing through the holes through the said base part to pass beneath the first and second-mentioned passage means, taking the form of bores in the said base part, and also beneath the said cups.

7. Liquid storage apparatus according to claim 3, wherein the said base part, bearing the jacket and said cups, is mounted for rotation about a substantially upright axis, wherein stepping drive means are provided for bringing any selected cup into a predetermined position of angular displacement about the axis of rotation of the said base part, wherein the second-mentioned passage means, comprising bores in the said base part which respectively open into the said cups at a given level, are extended beyond the cups by respective further bores in the said base part leading to respective downwardly discharging overflow passages in an annular array concentric with the said axis of rotation, and wherein the stationary base includes an annular drain disposed beneath and concentrically with the said array whereby any liquid overflowing into a said further bore is discharged into the annular drain.

8. Liquid storage apparatus according to claim 7, wherein an annular groove in the underside surface of the said base part surrounds the outlet of each overflow passage such that liquid will not run on the underside surface and contaminate other parts of the liquid storage device.

9. Liquid storage apparatus according to claim 1, wherein means are provided for detecting when the level of liquid in any such liquid storage container has fallen below a predetermined value and for providing a warning under such circumstances.

10. Liquid storage apparatus according to claim 4, further comprising a light detector stationarily mounted within the heat-insulated jacket and centrally of the liquid storage containers, these containers having transparent walls, a stationary light source mounted to direct a beam of light at the detector from a point at a greater radial spacing than the liquid storage containers from the axis of rotation of the said base part, and an alarm arranged to be actuated in response to a significant change in the intensity of the detected light with a liquid storage container in the path of the beam of light, whereby to provide an indication when the liquid level in that liquid container falls below a given level.

11. Liquid storage apparatus according to claim 3, wherein the said base part is provided with guide tubes for respectively accommodating the lower parts of the liquid storage containers.

* * * * *